(12) United States Patent
Constantinescu et al.

(10) Patent No.: US 11,698,965 B2
(45) Date of Patent: Jul. 11, 2023

(54) DETECTION OF ENCRYPTING MALWARE ATTACKS

(71) Applicant: International Business Machines Corporation, Armonk, NY (US)

(72) Inventors: M Corneliu Constantinescu, San Jose, CA (US); Frank Schmuck, Campbell, CA (US); Deepavali M. Bhagwat, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/844,856

(22) Filed: Apr. 9, 2020

(65) Prior Publication Data
US 2021/0319103 A1    Oct. 14, 2021

(51) Int. Cl.
*G06F 21/56* (2013.01)
*G06F 16/17* (2019.01)
(Continued)

(52) U.S. Cl.
CPC ........ *G06F 21/566* (2013.01); *G06F 16/1734* (2019.01); *G06F 16/182* (2019.01);
(Continued)

(58) Field of Classification Search
CPC .. G06F 21/566; G06F 21/565; G06F 16/1734; G06F 16/185; G06F 2221/034; G06N 20/00
See application file for complete search history.

(56) References Cited

U.S. PATENT DOCUMENTS 9,292,687 B2    3/2016   Thure et al.
9,491,142 B2   11/2016   Xie et al.
(Continued)

FOREIGN PATENT DOCUMENTS

CN    107749859 A    3/2018
KR    101817636 B1   1/2018

OTHER PUBLICATIONS

Kharaz et al. (2016). UNVEIL: A Large-Scale, Automated Approach to Detecting Ransomware. Retrieved Mar. 12, 2022 from https://www.usenix.org/conference/usenixsecurity16/technical-sessions/presentation/kharaz (Year: 2016).*

(Continued)

*Primary Examiner* — Brian F Shaw
(74) *Attorney, Agent, or Firm* — Zilka-Kotab, P.C.

(57) ABSTRACT

A computer-implemented method includes monitoring file access activity and generating an audit log based on the file access activity. The method also includes collecting samples of file usage activity, running a pattern recognition algorithm on the samples of the file usage activity for detecting malware activity, and, in response to detecting malware activity, restoring at least one file based on the audit log. A computer program product includes one or more computer readable storage media and program instructions collectively stored on the one or more computer readable storage media. The program instructions include program instructions to perform the foregoing method. A system includes a processor and logic integrated with the processor, executable by the processor, or integrated with and executable by the processor. The logic is configured to perform the foregoing method.

18 Claims, 4 Drawing Sheets

(51) Int. Cl.
  *G06N 20/00* (2019.01)
  *G06F 16/182* (2019.01)
(52) U.S. Cl.
  CPC ........... *G06F 21/565* (2013.01); *G06N 20/00* (2019.01); *G06F 2221/034* (2013.01)

(56) References Cited

U.S. PATENT DOCUMENTS

| | | | |
|---|---|---|---|
| 2018/0012021 A1 | 1/2018 | Volkov | |
| 2018/0075234 A1 | 3/2018 | Boutnaru | |
| 2019/0392146 A1* | 12/2019 | Gezalov | G06F 21/56 |
| 2021/0006574 A1* | 1/2021 | Venter | G06F 11/3006 |
| 2021/0160274 A1* | 5/2021 | Murphy | H04L 63/1408 |

OTHER PUBLICATIONS

Kharraz (UNVEIL:A Large-Scale, Automated Approach to Detecting Ransomware; retrieved Sep. 24, 2022 from https://www.usenix.org/conference/usenixsecurity16/technical-sessions/presentation/kharaz, 2016) (Year: 2016).*

Scaife et al., "CryptoLock (and Drop It): Stopping Ransomware Attacks on User Data," 2016 IEEE 36th International Conference on Distributed Computing Systems, 2016, pp. 303-312.

Chen et al., "Uncovering the Face of Android Ransomware: Characterization and Real-Time Detection," IEEE Transactions on Information Forensics and Security, vol. 13, No. 5, May 2018, pp. 1286-1300.

Kurapati, S., "Avoiding Latency in Enforcing Malware Detection Results With Encrypted Traffic," IP.com Prior Art Database, Technical Disclosure No. IPCOM000251723D, Nov. 29, 2017, 6 pages.

Kharraz et al., "UNVEIL: A Large-Scale, Automated Approach to Detecting Ransomware," Proceedings of the 25th USENIX Security Symposium, Aug. 2016, pp. 757-772.

Held, M., "Detecting Ransomware," Master Thesis, Faculty of Sciences, Konstanz Univeritat, 2018, 26 pages.

Morato et al., "Ransomware early detection by the analysis of file sharing traffic," Journal of Network and Computer Applications, vol. 124, 2018, pp. 14-32.

Satyanarayanan, M., "The Influence of Scale on Distributed File System Design," IEEE Transactions on Software Engineering, vol. 18, No. 1, Jan. 1992, pp. 1-8.

Wikipedia, "Zero-day (computing)," Wikipedia, pp. 1-8, retrieved Mar. 25, 2020 from https://en.wikipedia.org/wiki/Zero-day_(computing).

Pointnity Network, "Three dimensions of distributed system scalability design," Medium, Jun. 15, 2018, pp. 1-3, retrieved from https://medium.com/@Pointnity_Network/three-dimensions-of-distributed-system-scalability-design-8e0319163c8d.

Vogel, W., "A Word on Scalability," All Things Distributed Werner Vogels' weblog on building scalable and robust distributed systems, Mar. 30, 2006, 2 pages, retrieved from https://www.allthingsdistributed.com/2006/03/a_word_on_scalability.html.

TheZoo_"theZoo—A Live Malware Repository," theZoo aka Malware DB, 5 pages, retrieved Mar. 25, 2020, from https://thezoo.morirt.com/.

Zeltzer, L., "How Would You Detect and Impede Ransomware on an Endpoint?," Lenny Zeltzer, 2016, 5 pages, retrieved from https://zeltser.com/detect-impede-ransomware/#.

SANS ISC, "Using File Entropy to Identify "Ransomwared" Files," SANS ISC InfoSec Forums, Aug. 2016, 5 pages, retrieved from https://isc.sans.edu/forums/diary/Using+File+Entropy+to+Identify+Ransomwared+Files/21351/.

Kharraz et al., "Redemption: Real-time Protection Against Ransomware at End-Hosts," Northeastern University, 2017, 22 pages, retrieved Mar. 26, 2020 from https://seclab.ccs.neu.edu/static/publications/raid2017redemption.pdf.

* cited by examiner

DETECTION OF ENCRYPTING MALWARE ATTACKS

BACKGROUND

The present invention relates to ransomware attacks, and more specifically, this invention relates to detection and protection from "zero day" ransomware attacks in distributed file system deployments.

Ransomware is malware that encrypts victims' files. Ransomware typically includes extorting a ransom to be paid within a short time frame, or risk losing the files. Ransomware is increasingly widespread due to the availability of difficult to track crypto currency for receiving ransom payments.

SUMMARY

A computer-implemented method, according to one embodiment, includes monitoring file access activity and generating an audit log based on the file access activity. The method also includes collecting samples of file usage activity, running a pattern recognition algorithm on the samples of the file usage activity for detecting malware activity, and, in response to detecting malware activity, restoring at least one file based on the audit log.

A computer program product, according to another embodiment, includes one or more computer readable storage media and program instructions collectively stored on the one or more computer readable storage media. The program instructions include program instructions to perform the foregoing method.

A system, according to another embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for detecting and protecting against ransomware attacks in distributed file system deployments.

In one general embodiment, a computer-implemented method includes monitoring file access activity and generating an audit log based on the file access activity. The method also includes collecting samples of file usage activity, running a pattern recognition algorithm on the samples of the file usage activity for detecting malware activity, and, in response to detecting malware activity, restoring at least one file based on the audit log.

In another general embodiment, a computer program product includes one or more computer readable storage media and program instructions collectively stored on the one or more computer readable storage media. The program instructions include program instructions to perform the foregoing method.

In another general embodiment, a system includes a processor and logic integrated with the processor, executable by the processor, or integrated with and executable by the processor. The logic is configured to perform the foregoing method.

Figure 1:
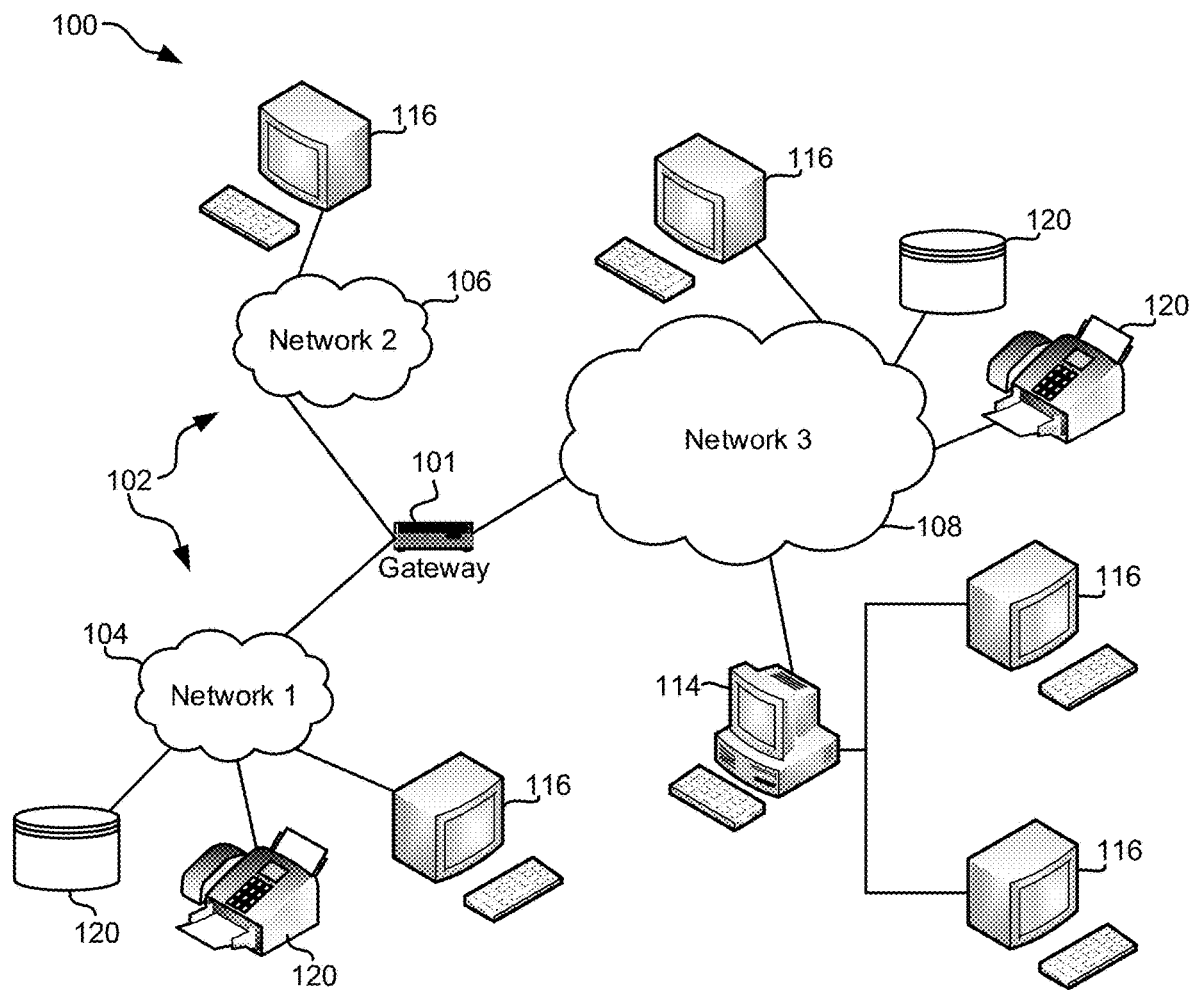
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
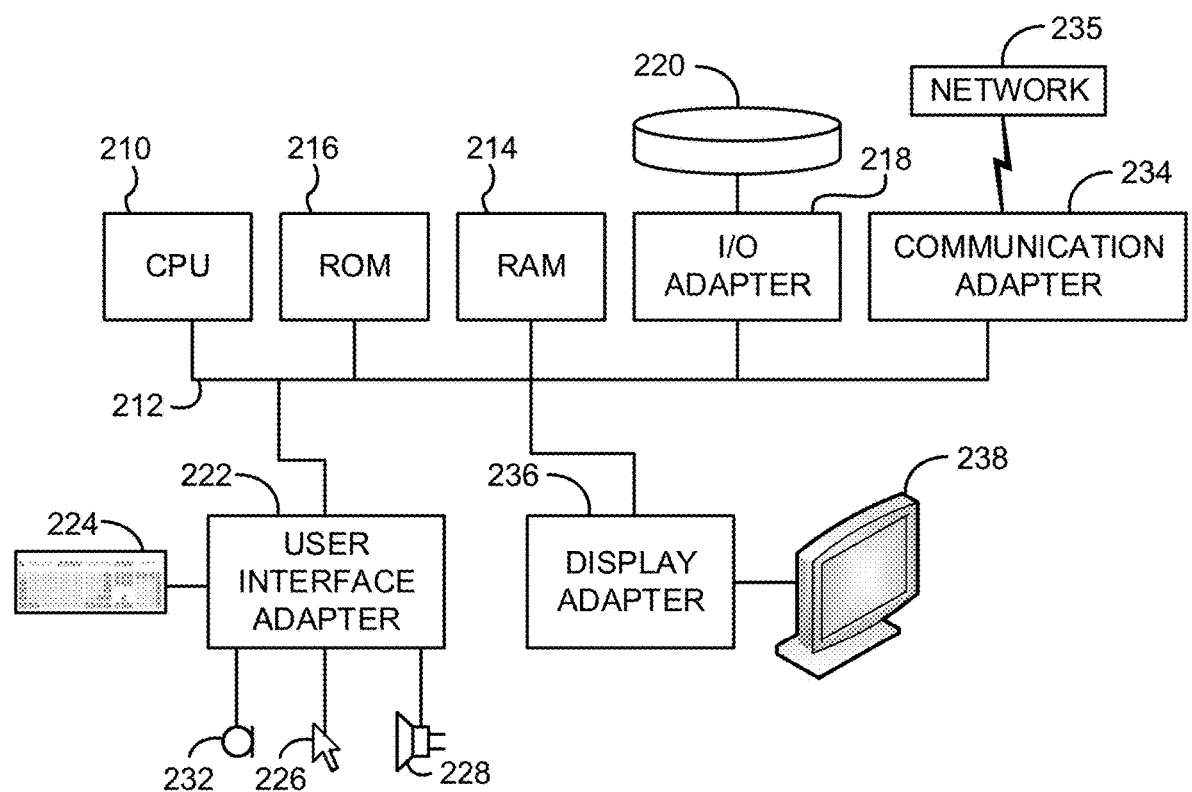
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
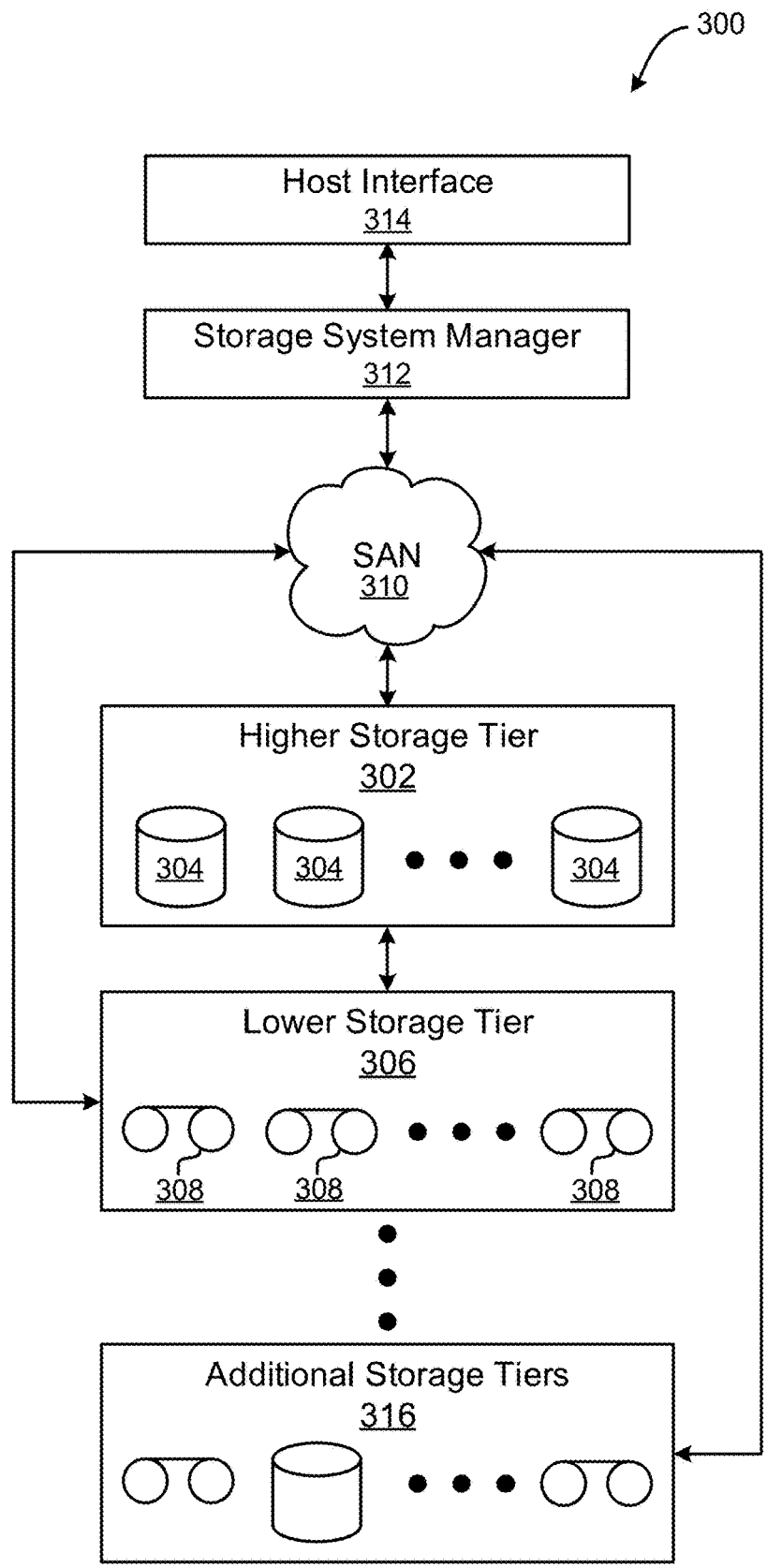
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Ransomware is an increasingly prevalent form of malware which encrypts victims' files for extorting a ransom to be paid within a short time frame or risk losing the files. Zero-day vulnerability is computer software vulnerability that is unknown and/or unaddressed by the target. Hackers may exploit zero-day vulnerability to adversely affect computer programs, data, additional computers, a network, etc. A zero-day attack is a hacker exploit directed at zero-day vulnerability and "day zero" typically refers to the day on which the target learns of the vulnerability.

Conventional solutions to detect ransomware attacks run on individual Windows® desktops and laptops that use kernel modules or network sniffers to capture and analyze file system traffic. Solutions which are implemented directly onto the client side may be considered intrusive and include taking snapshot copies of data flowing over a network for analysis following extraction. Conventional solutions extend the functionality of the kernel to perform changes in the kernel nodes of the clients. However, the foregoing solutions do not scale to distributed file system deployments comprising a client and server architecture. Scalability may refer to location transparency, client caching ability, the efficiency of bulk data transfers, etc., in at least some approaches.

Known ransomware detectors which use audit logs to analyze file system activity do not monitor file system activity in sufficient detail and are prohibitively expensive for practical operation where the detectors rely on "auditd" to generate audit events in more detail than otherwise customary. For large, distributed file system deployments (e.g., IBM Spectrum® Scale), there remains a need for a lightweight solution which runs on servers and/or clients to detect and correct possible corruption due to ransomware. More preferably, a lightweight solution for distributed file system deployments does not include significant changes to client systems. A lightweight solution preferably includes a solution with relatively low resource consumption.

Various embodiments of the present disclosure limits damage to files by providing ransomware detection and recovery based on analyzing file access patterns, using file system facilities, such as audit logs, filter drivers (e.g., Windows®), stacked file systems (e.g., Unix®), and/or lightweight events (e.g., IBM Spectrum® Scale). Access is preferably monitored at two levels of detail in various approaches described herein. Access is monitored at a high level for ransomware detection, including information about individual read and write operations (e.g., offset, length, entropy, etc.). Access is monitored at a low level for recovery (e.g., enough information is monitored to enable tracking of files being updated and/or deleted).

In some approaches, periodic, high detail samples of file system activity are taken and analyzed to detect ransomware and a low detail access log is used to identify the files that might have been corrupted and/or files to be restored from backup and/or snapshots. Monitoring the files may be performed at two levels of detail including a high level of detail and a low level of detail. Monitoring at a high level of detail includes monitoring information associated with individual read and/or write operations (e.g., from each node). In a preferred embodiment, the high level of monitoring is associated with detection of malware activity to be described in detail below. Monitoring at a low level of detail includes tracking files which are updated and/or deleted by a process. In another preferred embodiment, the low level of monitoring is used to identify the at least one file to be restored to be described in detail below. A process may refer to a process associated with malware activity in at least some embodiments.

At least some of the embodiments of the present disclosure may be used in conjunction with IBM Qradar® and similar systems including ELK, Splunk®, etc., for protecting against known malware signatures. Methods based on analyzing network traffic may be complementary to at least some of the approaches described herein.

Figure 4:
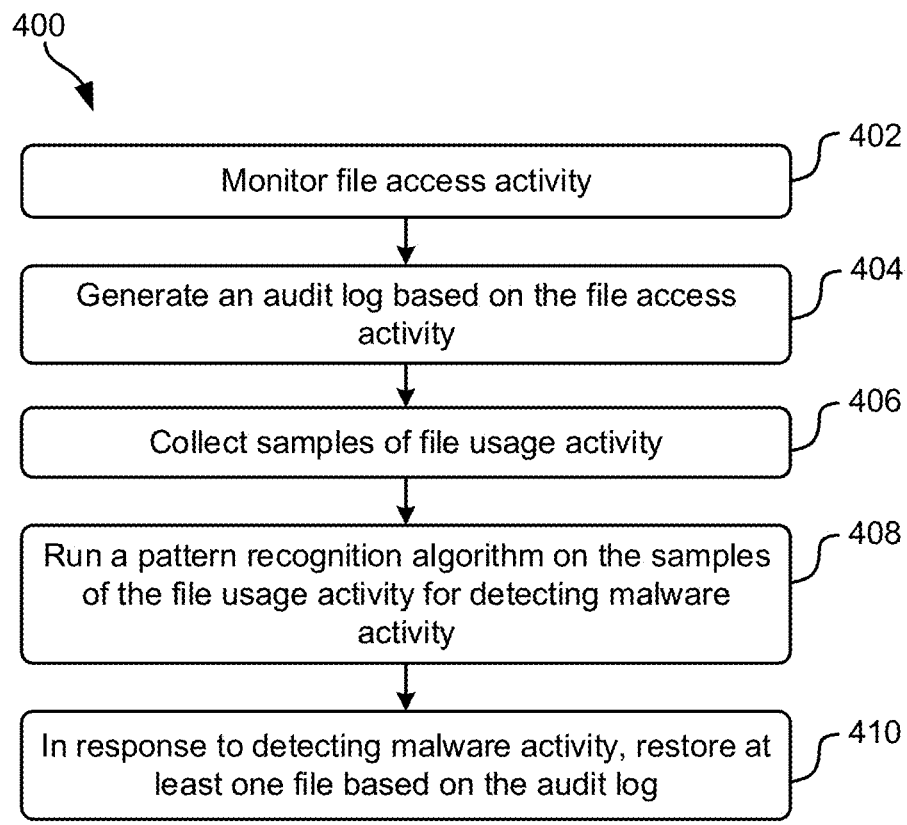
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes monitoring file access activity. In one preferred approach, IBM Spectrum Scale® File Audit Logging is used to monitor file access activity and/or generate an audit log (see operation 404 below) based on the file access activity. File access activity may include any file updates, deletions, snapshots, backup events, etc., from each node. File access activity may be serialized by a stream processing engine. In some approaches, file access activity may also include malfunctioning activity.

Operation 404 includes generating an audit log based on the file access activity. In preferred approaches, the audit log is used to revert and/or restore at least one file to a last known "good" copy of the file. Reverting at least one file may refer to reverting the at least one file to the last full copy of the file. Restoring at least one file may refer to restoring the at least one file to the last copy of the file in a backup.

Generating the audit log preferably includes capturing file operations on a file system and logs the operations to a retention enabled file set. The audit logs may capture snapshots events and/or backup events. The foregoing events may enable recovery (e.g., reversion and/or restoration) of a corrupted file to the most recent uncorrupted version of the file. In preferred embodiments, the audit log is stored in a database for enabling system auditing.

Operation 406 includes collecting samples of file usage activity. In one approach, operation 406 occurs on each node of a distributed file system. Each node locally processes live events collected in a relatively short period of time in a memory buffer in the node. The relatively short period of time may be set by a user, a client, a server, a manufacturer, a default setting, etc. The live events may be collected periodically, randomly, substantially constantly, in response to a trigger event, etc., as determined by a user, a client, a server, a manufacturer, a default setting, etc. The collecting of detailed live events is scalable to the distributed file system and increasing number of nodes. In one preferred approach, an augmented version of IBM Spectrum Scale® Watch Folders collects the samples of file usage activity.

In preferred approaches, application(s) are not blocked during collection of the samples of file usage activity and/or analysis thereof. The live events may be collected in memory and any analysis is performed after collection thereof. In some embodiments, the node from which live events are collected may perform any analysis to be described in detail below. The analysis may be run on a plurality of nodes to balance the overall load on the nodes that the analysis puts on the cluster.

In preferred embodiments, monitoring file usage activity may include collecting live event notifications for file accesses from a file system. The live event notifications are preferably periodic. In some approaches, notifications associated with the live events are provided. The file usage activity may be used to detect malware activity according to the various operations described herein.

In various approaches, data collected from file events for each Process ID (PID) may include file table entry structure information such as: file path, file name, extension containing fields (per file values), etc. Each PID may represent and/or uniquely identify an active process. The data per PID may include current status (e.g., open, read, write, closed, deleted), newly_created (e.g., yes=open during current time window, no=otherwise), newly_open (e.g., yes=open during current time window, no=otherwise), bytes_read (e.g., cumulated, from read events on the file), bytes_written (e.g., cumulated, from write events), file_size (e.g., at open or just before unlink/delete), min_read_offset, max_read_offset (e.g., //max_read_offset includes read_len), min_write_offset, max_write_offset (e.g., //max_write_offset includes write_len), read_entropy, write_entropy (e.g., averaged high and low→low), etc. Values may be computed across files in each PID table including total_nbr_deleted_files, total_nbr_overwritten_files (e.g., //computed in second scan), per_PID_bytes_read, per_PID_bytes_written, per_PID_perc_files_written (e.g., //computed in second scan as the percentage of files accessed for write from all file accesses (for either read or write) by the process PID), etc.

In preferred approaches, each active process in a distributed file system may be associated with an individual process ID. In some approaches, each machine in a distributed file system may be associated with an individual process ID. In other approaches, each node in a distributed file system may be associated with an individual process ID.

In preferred embodiments, the file access activity and the file usage activity are associated with files stored in a distributed file system.

Operation 408 includes running a pattern recognition algorithm on the samples of the file usage activity for detecting malware activity. Malware activity preferably includes ransomware activity. Malware activity may be interchangeably be referred to as a suspected process as used throughout the present disclosure. In a preferred embodiment, running the pattern recognition algorithm comprises analyzing elements associated with the file usage activity including read/write offsets, associated lengths, real time entropy calculations, etc.

In various preferred embodiments, running the pattern recognition algorithm comprises feeding the audit log into an artificial intelligence (AI) model trained by machine learning according to various embodiments described in detail below.

A pattern recognition algorithm may be for detecting behavioral ransomware in file systems. In one approach, the pattern recognition algorithm may detect attack patterns on files (e.g., based on the file usage activity, etc.). One attack pattern includes "file overwriting" where a full file or a partial file are overwritten with relatively higher entropy. The relatively higher entropy is indicative of encrypted and/or compressed data. Another attack pattern includes "file replacing" where file content is read, encrypted and copied to a newly created file. The newly created file has a similar (but mangled) name and/or size to the original file. The original file is deleted (e.g., unlinked).

In one approach, elements associated with the file usage activity which are used to enable detection include GPFS policy event rules, user PID, file name, file size, minimum read offset, maximum read offset, minimum write offset, maximum write offset, sample read entropy, sample write entropy, etc., or any combination thereof. The foregoing elements are aggregated on CLOSE event in some approaches. The file access, monitoring, and/or detection preferably runs periodically for relatively short windows (e.g., about 10 seconds to about 100 seconds).

In one embodiment, in response to a pattern recognition algorithm detecting malware activity, a detailed analysis of the files modified by the suspected process is performed. For example, a detailed analysis may include reading various parts of the modified files, computing entropy, etc. In various approaches, the detailed analysis may be allocated to a different node from the node from which the modified files are stored. The different node may be allocated the detailed analysis for load balance where any node in a distributed file system can access any file.

In some embodiments, a detection algorithm may be used for each PID and/or client. The initial values of the detection algorithm may evolve differently for each PID based on user (e.g., a client, a manufacturer, a third party, etc.) feedback. For example, the initial values of the detection algorithm may include:

client-mode=yes/no
k=time window size (seconds) to collect event data (e.g., 10 seconds)
N=maximum # deleted files (e.g., 10 to 20 files)
Min_perc_files_written (e.g., about 40% of files either read or written)

In one exemplary configuration, file events may be monitored for k seconds (e.g., time window). The file system event policies may be set to issue relevant events (e.g., read, write, create, open, close, delete) with file paths and process ID and output events to a small buffer which hold one to a few events (e.g., enough buffer to parse the events and/or extract content from the events). The file system events for each PID may be monitored for the maximum k seconds. A PID file table may be created for data collected from file events. For example, for each new file name encountered in file system events, a new file entry may be created in the specified PID file table and the new file entry may be initialized. File_path may be shared by files in the same directory to take less space. The file entries may be updated in PID file tables with values found in successive events. In this configuration, compute the aggregated: total_nbr_deleted_files, min_read_offset, max_read_offset, min_write_offset, max_write_offset, read_entropy, write_entropy (combining entropies: high+low→low), etc. If ((per_PID_bytes_read (very)!=per_ID_bytes_written) and (per_PID_perc_files_written<Min_perc_files_written)) then {No malware activity detected; clear the collected data for this PID; go to monitoring step}. For each file in collected file table entries (e.g., for each PID), detect overwritten files. For example, if ((current_status==closed) and (bytes_read~=bytes_written) and (read_area~coincides write_area) and (write_entropy>read_entropy)) then count the files as overwritten: total_nbr_overwritten_files++. If (total_nbr_overwritten_files>N) then go ahead to the asking operation (e.g., query the user). Then detect deleted files and newly created ones where if ((current_status=="deleted") and (max_read_offset==file_size)) then {total_nbr_deleted_files++; deleted_file_size_i=File_size; deleted_file_name_i=file name} //the file is possibly unlinked by ransomware. If (newly_created==yes) then {newly_created_size_j=file_size; newly_created_file_name_j=file name} // store the size and file name. For each file in the deleted file list: //detect replaced files. If (newly_created==yes) then {newly_created_size_j=file_size; newly_created_file_name_j=file name} //store the size and the file name. For each file in the deleted file list: //detect replaced files. If (newly_created_size(j) and newly_created_file_name(j) are also in deleted_file_size(i) and deleted_file_name(i) and (bytes_read(i)~=bytes_written(j)) and (read_area(i) ~coicindes write_area(j)) and (write_entropy(j)>read_antropy(i))) then total_nbr_replaced_files++. If total_nbr_replaced_files<N, go back to the detecting deleted files and newly created files operation. Otherwise ask user (e.g., client) if she "performs lots of file encryptions or deletion" and if (answer=="no") then disable client access to the file system; else if (answer=="yes") then {learn from user's and/or administrator feedback and update accordingly the parameter values for this user/PID} and go back to the detecting deleted files and newly created files operation. Use the audit log to identify files written or deleted by the PID and, for each file, determine the most recent snapshot or backup that contains a version of the file before it was written/deleted by the PID and restore the content of the file from that snapshot or backup.

Operation 410 includes, in response to detecting malware activity, restoring at least one file based on the audit log. In preferred embodiments, the audit log captures snapshots and backup events. Snapshots and backup events may be used for precise recovery of the at least one file by providing the most recent uncorrupted version of a file. At least some of the offsets collected may be used to identify the area of the file that was accessed and/or corrupted. In some approaches, the audit log is used to match the detected process ID which corresponds to the malware activity.

In one example, in response to a rw_nodeID_PID process is detected by a node, a search of the database for files modified and/or deleted by rw_nodeID_PID indicates what files to restore from the latest snapshot or backup.

In various approaches, monitoring file access activity and/or collecting samples of file usage activity may be performed by a detection daemon. The detection daemon may perform the various operations either directly on the client side or on the file server side. Performing operations directly on the client may be performed on the General Parallel File System (GPFS®) node without the client. The exact malware process may be detected at fine granularity where the detection daemon is run on the client side (e.g., where the application(s) run). In a preferred embodiment, performing operations on the file server side includes using a storage networking protocol. The client machine infected by the ransomware may be detected where the detection daemon is run on the file server side. Access of the infected client machine to the file system may be disabled.

File access patterns detection may be based on machine learning in various embodiments. Samples may be collected from systems running workloads with or without malware activity. The samples may be used as training data for machine learning model (e.g., supervised learning). In response to detecting malware activity, feedback from the user may be used to train the model in at least one embodiment.

In an exemplary test system, the GPFS is a file server for a set of Windows® clients. The exemplary test system includes an Ubuntu® 18.04 host and VirtualBox® 5.2 hypervisor. The exemplary test system guests include Windows® 7 and CentOS® 7. On CentOS® 7, IBM Spectrum Scale® 5.0.3 is set up. Windows® 7 comprises most of the files (e.g., documents folder) on a server message block (SMB) shared on GPFS. Malware samples from the Zoo repository. Ransomware is injected and run in Windows® 7 guest under Cuckoo Sandbox® and the collect policy selects GPFS events in a log. The collection time was about 60 seconds. A number of logs for the available ransomware samples are collected. A Python® implementation of the detection algorithm is run on the event logs to detect ransomware attacks. Benign usage logs generated on the same system are used to test the algorithm on various normal usage scenarios. Event traces on realistic, production system setups are preferably collected. The detection algorithm is speed optimized for real-time ransomware detection.

Various elements associated with the file usage activity which are used by the pattern recognition algorithm for detecting malware activity include events (e.g., OPEN, CLOSE, CREATE, UNLINK, DESTROY, RENAME, etc.), common attributes on every event (e.g., fsName, nodeName, processID, inode, pathName, fileSize, timeStamp, etc.), CLOSE events additional attributes (e.g., minimum read offsets, maximum read offsets, minimum write offsets, maximum write offsets, bytes read, bytes written, max read entropy, min write entropy, etc.), etc. Various default thresholds may be associated with each of the elements for detecting malware activity. Malware activity may be based a predefined change in at least one of the elements and/or any combination thereof.

File access patterns detection may be based on machine learning in various embodiments. Samples may be collected from systems running workloads with or without malware activity. The samples may be used as training data for machine learning model (e.g., supervised learning). In response to detecting malware activity, feedback from the user may be used to train the model in at least one embodiment.

According to existing malware detection techniques, the 'file' command is used to determine the types of files wherein malware activity is detected. These techniques are problematic where, if the header is not encrypted but the rest of the file is, the malware activity is not detected in the file. In stark contrast, various embodiments of the present invention detect partially encrypted files using features such as the maximum and/or minimum read/write offsets for both overwritten files with encrypted content, replaced files, and/or newly created files. Conventional malware techniques do not include operations for detection of partially encrypted files and the replacement of deleted files as disclosed herein.

Existing malware detectors are targeted to run on individual desktops using Windows® filter-drivers which intercept, and redirect write requests to a protected storage area to attempt to merge the benign writes back to the user file(s). Existing malware detectors which run on individual desktops do not scale to relatively large distributed file system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
monitoring file access activity on nodes in a distributed file system comprising a server in communication with the nodes;
generating an audit log based on the file access activity on the nodes;
periodically collecting samples of file usage activity over predefined windows of time from the nodes, wherein the windows of time are cumulatively less than a duration of the monitoring, wherein the nodes locally process events that are collected over a period of time in memory buffers in the respective nodes;
running a pattern recognition algorithm on the samples of the file usage activity for detecting malware activity;
in response to detecting malware activity, restoring at least one file based on the audit log; and
in response to detecting suspected malware activity, modifying a file of one of the nodes, performing a detailed analysis of the modified file, wherein the detailed analysis is performed by a different node than the node on which the modified file is stored.

2. The computer-implemented method of claim 1, wherein running the pattern recognition algorithm comprises analyzing elements associated with the file usage activity selected from the group consisting of: read/write offsets, lengths, and real time entropy calculations.

3. The computer-implemented method of claim 1, wherein running the pattern recognition algorithm comprises feeding the audit log into an artificial intelligence (AI) model trained by machine learning.

4. The computer-implemented method of claim 1, wherein each window of time is less than about 100 seconds.

5. The computer-implemented method of claim 1, wherein the samples of the file usage activity include live event notifications, wherein applications are not blocked during collection of the live event notifications, wherein the live event notifications are collected on each node of the distributed file system.

6. The computer-implemented method of claim 1, wherein the file access activity on the nodes in the distributed file system includes activities selected from the group consisting of: file updates, deletions, snapshots, and backup events; wherein the samples of file usage activity correspond to live events processed locally on the nodes, wherein each node collects the samples for activities occurring on that node.

7. A computer program product, the computer program product comprising:
one or more computer readable storage media, and program instructions collectively stored on the one or more computer readable storage media, the program instructions comprising:
program instructions to monitor file access activity on nodes in a distributed file system comprising a server in communication with the nodes;
program instructions to generate an audit log based on the file access activity, wherein the audit log includes backup events and snapshot events;
program instructions to collect samples of file usage activity from each of the nodes, wherein the collecting is scalable to the distributed file system and an increasing number of nodes;
program instructions to run a pattern recognition algorithm on the samples of the file usage activity for detecting malware activity;
program instructions to, in response to detecting malware activity modifying a file of one of the nodes, perform a detailed analysis of the modified file, wherein the detailed analysis is performed by a different node than the node on which the modified file is stored for load balancing; and
program instructions to restore the file based on the audit log, wherein restoring the file includes restoring the file to a last copy of the file in a backup referred to in a backup event in the audit log.

8. The computer program product of claim 7, wherein the samples are of file usage activity over predefined windows of time, wherein the windows of time are cumulatively less than a duration of the monitoring, wherein the samples are taken periodically.

9. The computer program product of claim 7, wherein running the pattern recognition algorithm comprises feeding the audit log into an artificial intelligence (AI) model trained by machine learning.

10. The computer program product of claim 8, wherein each window of time is less than about 100 seconds.

11. The computer program product of claim 7, wherein the samples of the file usage activity include live event notifications.

12. The computer program product of claim 7, wherein applications are not blocked during collection of the file usage activity.

13. The computer program product of claim 7, wherein detecting malware activity includes detecting an attack pattern selected from the group consisting of: file overwriting and file replacing.

14. A system, comprising:
a server comprising a processor and logic integrated with the processor, executable by the processor, or integrated with and executable by the processor,
the logic being configured to:
collect monitored file access activity on nodes in a distributed file system comprising the server in communication with the nodes;
generate an audit log based on the monitored file access activity, wherein the audit log includes backup events and snapshot events;
periodically collect samples of file usage activity over predefined windows of time by collecting live event notifications for file accesses from the distributed file system, wherein the windows of time are cumulatively less than a duration of the monitoring;
run a pattern recognition algorithm on the samples of the file usage activity for detecting malware activity;
in response to detecting malware activity, restore at least one file based on the audit log, wherein restoring at least one file includes restoring the at least one file to a last copy of the file in a backup referred to in a backup event in the audit log; and
in response to detecting suspected malware activity, modifying a file of one of the nodes, allocating performance of a detailed analysis of the modified file to a different node than the node on which the modified file is stored, wherein the detailed analysis is performed by the different node.

15. The system of claim 14, wherein running the pattern recognition algorithm comprises analyzing elements associated with the file usage activity selected from the group consisting of: read/write offsets, lengths, and real time entropy calculations.

16. The system of claim 14, wherein running the pattern recognition algorithm comprises feeding the audit log into an artificial intelligence (AI) model trained by machine learning.

17. The system of claim 14, wherein each window of time is less than about 100 seconds.

18. The system of claim 14, wherein the samples of the file usage activity include live event notifications received from the nodes.

* * * * *